C. GRÜTZNER.
PROPULSION OF SHIPS AND BOATS.
APPLICATION FILED JULY 6, 1911.
1,007,281.
Patented Oct. 31, 1911.
2 SHEETS—SHEET 2.
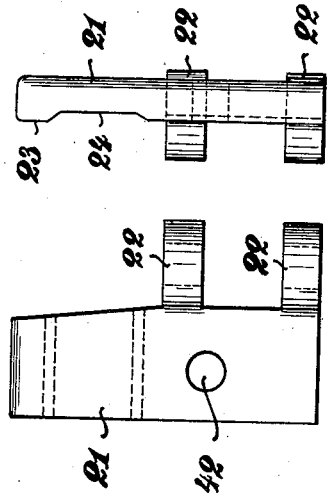
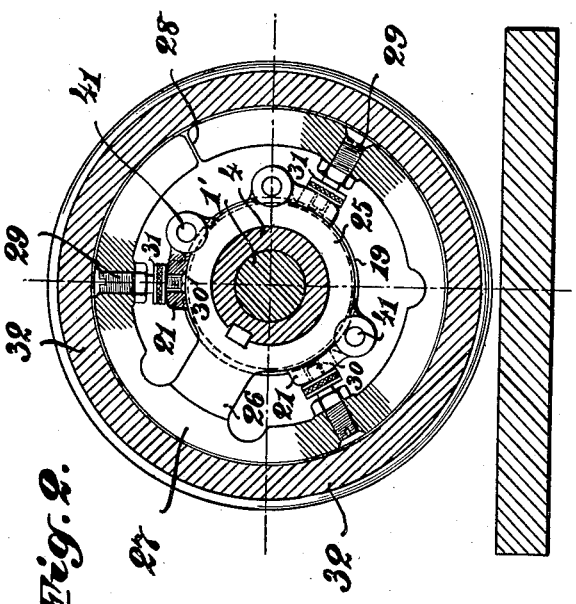

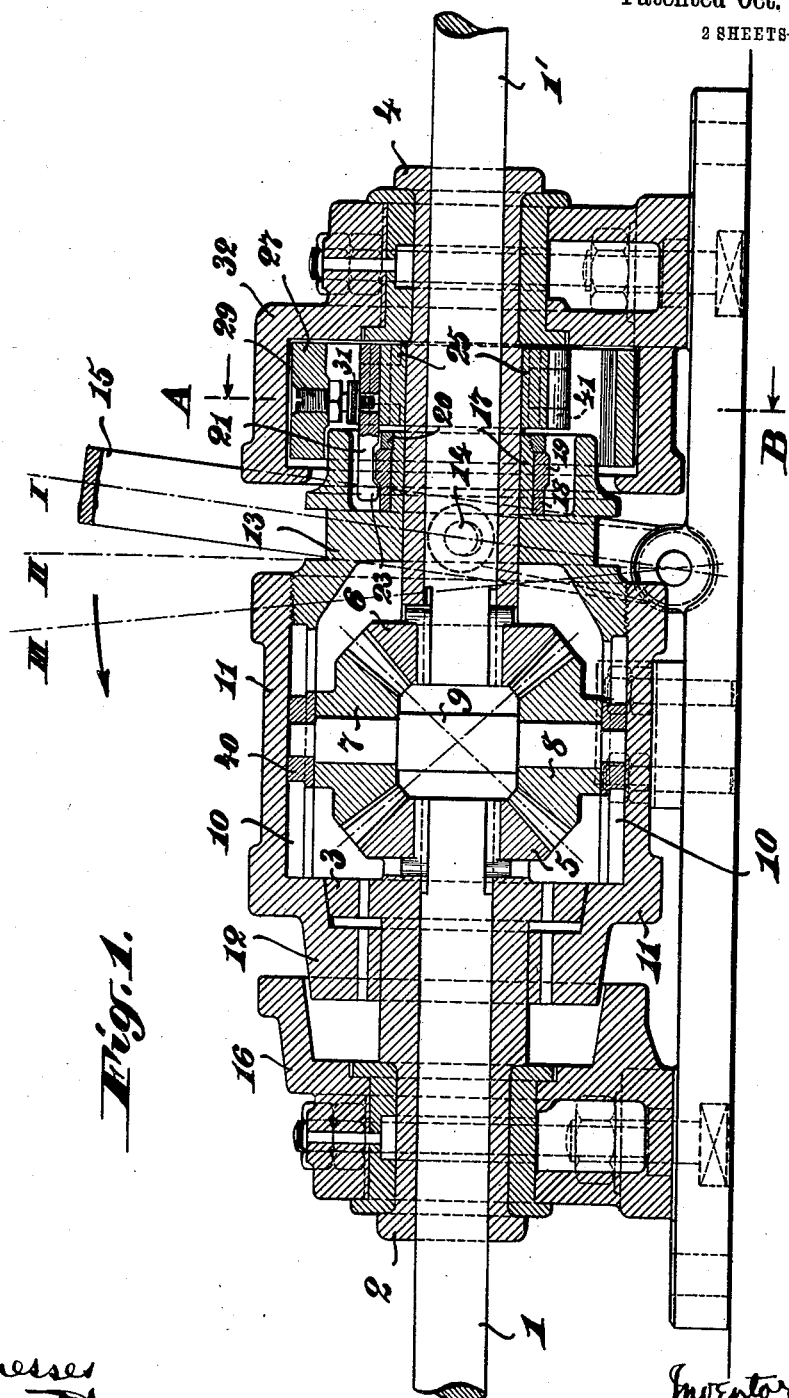

UNITED STATES PATENT OFFICE.

CARL GRÜTZNER, OF TEMPELHOF, NEAR BERLIN, GERMANY.

PROPULSION OF SHIPS AND BOATS.

1,007,281.  Specification of Letters Patent.  Patented Oct. 31, 1911.

Application filed July 6, 1911. Serial No. 637,198.

*To all whom it may concern:*

Be it known that I, CARL GRÜTZNER, of Tempelhof, a subject of the King of Prussia, and whose post-office address is 1 Kaiser Wilhelm strasse, Tempelhof, near Berlin, Kingdom of Prussia, German Empire, have invented new and useful Improvements in or Relating to the Propulsion of Ships and Boats, of which the following is a specification.

This invention relates to the propulsion of ships and boats and has for its object to provide gearing for reversing the direction of rotation of the propeller without necessitating the reversal of the motor supplying the power. The present improvement relates to that type of reversing mechanism in which a bevel wheel differential gear is employed in conjunction with a movable clutch member.

According to this invention the transverse pin which carries the intermediate bevel pinions of the differential gear is mounted so as to be capable of sliding within the movable member of the clutch the latter being also combined with a device which during the movement of the clutch member from one extreme position to the other temporarily causes braking of the driving shaft and the clutch member in an adjustable manner.

One construction of a reversing mechanism according to this invention is illustrated by way of example in the accompanying drawings.

Figure 1 is a longitudinal section through the device, Fig. 2 is a transverse section through the braking part of the device taken on the line A—B of Fig. 1, and Figs. 3 and 4 show a detail of the braking device on an enlarged scale.

On the propeller shaft 1 is keyed a sleeve 2 carrying one bevel wheel 5 of the differential gear and provided with a cone clutch member 3. On the driving shaft $1^1$ is keyed a sleeve 4 carrying the other main bevel wheel 6 of the differential gear. With the bevel wheels 5 and 6 engage the two bevel wheels 7 and 8 carried on a transverse pin 9 the ends of which are carried in blocks 40 which slide in longitudinal grooves 10 formed in a sleeve 11 which constitutes part of the movable clutch member. At one end of this sleeve is arranged the conical clutch member 12 which has an internally coned surface for engaging the rotating clutch member 3 and an outer conical surface for engagement with the fixed clutch member 16. At the opposite end the sleeve 11 is provided with an annular groove 13 with which engage pins 14 carried by the lever 15 which is employed for shifting the sleeve 11 and effecting the reversal. When the lever is in the position I shown in full lines the sleeve 11 is coupled to the clutch member 3 so that the engine shaft $1^1$ drives the propeller shaft 1 direct and in the forward direction by means of the sleeve 11 and the gear wheels 5, 6, 7 and 8. On moving the lever 15 into the central position II the sleeve 11 is disengaged from the clutch 3 but the clutch member 12 is not in engagement with the fixed clutch member 16. Consequently the driving shaft $1^1$ has a tendency to rotate at a greater speed than the propeller shaft 1 and the bevel wheel 5 on the latter lags behind the bevel wheel 6 so that the sleeve 11 which is caused to rotate through the pin 9 and slide blocks 40 will revolve in the same direction as the engine shaft 1 but at less speed.

If the lever 15 is moved from the position II into the position III the outer cone of the clutch member 12 will be brought into engagement with and held fast by the stationary clutch member 16 the sleeve 11 also being held stationary together with the pin 9 and the bevel wheels 7 and 8 with the result that the propeller shaft 1 will be driven by the gear wheels 5, 6, 7 and 8 from the engine shaft $1^1$ but in the opposite direction to that in which the latter rotates.

In order to temporarily brake in an adjustable manner the engine shaft $1^1$ and the sleeve 11 while the lever 15 is being moved from the position I into the position III that portion of the sleeve 11 which is provided with the annular groove 13 is also formed with an extension 17 which surrounds the sleeve 4. On this extension 17 is rotatably mounted a ring 18 having an enlarged portion or shoulder 19 this ring being held in position against longitudinal shifting by a ring 20 screwed on to the extension 17. The external diameter of the ring 20 corresponds to the diameter of the smaller part of the rotatable ring 18. Adjacent to the extension 17 there is keyed on the sleeve 4 a ring 25 having a lug or projection 26 which carries a brake ring 27 split at 28. On the ring 25 are mounted three pawls 21 the shaft of each of which is shown on an enlarged scale in Figs. 3 and 4. Each of these pawls turns about a pin 41 which passes through lugs 22 formed on the pawl and a lug on the ring 25, the pins 41 lying parallel to the axis of the driving shaft so that the pawls can turn outwardly. Each pawl extends longitudinally with relation to the shaft $1^1$ toward the rings 18, 19 and 20 the extended portion of each pawl having a head 23 behind it which is recessed so that when the lever 15 is in the position I for driving ahead the pawls 21 rest with their heads 23 on the smaller part of the ring 18. A hole 42 formed in each pawl 21 receives the screw-threaded ends 30 of bolts 29 carried by the spring brake ring 27. Adjustable nuts 31 are provided on the screw-threaded ends 30 of these bolts the spring ring 27 resting with these nuts on the pawls 21 so that by adjustment of the nuts 31 the diameter of the brake ring can be varied and thus also is varied the clearance between the outer portion of the brake ring and the inner braking surface 32 which incloses the ring 27.

The operation of the braking device is as follows:—As shown in Fig. 1 when the reversing lever 15 is in the position I for driving ahead the propeller shaft 1, the brake ring 27 is not in contact with the brake surface 32. If the lever 15 is moved into the central idle position II and from this position into the position III for driving astern thereby shifting the sleeve 11 the heads 23 of the pawls 21 will first move on to the enlarged part 19 of the ring 18 in consequence of the latter having been moved longitudinally with sleeve 11. As a result the pawls 21 will turn on their pins 41 and by means of the nuts 31 and bolts 29 they will open out the spring ring 27 which will be forced against the brake surface 32 with a pressure corresponding to the adjustment that has been given to the nuts 31. This will produce a temporary braking of the driving shaft and the sleeve 11 until the enlarged part 19 of the ring 18 has passed from under the heads 23 of the pawls 21 and the heads of these pawls lie over the ring 20. This will occur when the sleeve 11 has been shifted by the lever 15 assuming the position III so as to effect driving astern when the clutch member 12 will be in engagement with the fixed clutch member 16. The brake ring 27 is then once more out of contact with the brake surface 32. When in these positions the driving shaft $1^1$ together with the sleeve 4, ring 25, pawls 21 and brake ring 27 can freely rotate in a direction which is the reverse of that in which the propeller shaft 1 rotates. It is obvious that by adjustment of the nuts 31 the strength or extent of the temporary braking of the driving shaft $1^1$ and of the sleeve 11, when the parts are in the intermediate position II, can be easily and accurately regulated.

What I do claim as my invention, and desire to secure by Letters Patent of the United States, is:—

1. In a reversing gear for ships and boats of the kind referred to the combination of a driving shaft, a propeller shaft, a bevel wheel differential gear, a shiftable clutch member, means for shifting the said clutch member from the position for driving ahead through an intermediate idle position into a position for driving astern, means for guiding the pin carrying the intermediate wheels of the said bevel wheel differential gear longitudinally in the said clutch member, and means for temporarily braking the driving shaft during the shifting of the said clutch member, substantially as set forth.

2. In a reversing gear for ships and boats of the kind referred to the combination of a driving shaft, a propeller shaft, a bevel wheel differential gear, a shiftable clutch member, means for shifting the said clutch member from the position for driving ahead through an intermediate idle position into a position for driving astern, means for guiding the pin carrying the intermediate wheels of the said bevel wheel differential gear longitudinally in the said clutch member, a brake comprising a spring ring bearing internally against pawls rotatably mounted on a ring rigidly connected to the driving shaft and a ring having an enlarged part and being rotatably mounted on an extension of the shiftable clutch member, substantially as set forth.

3. In a reversing gear for ships and boats of the kind referred to the combination of a driving shaft, a propeller shaft, a bevel wheel differential gear, a shiftable clutch member, means for shifting the said clutch member from the position for driving ahead through an intermediate idle position into a position for driving astern, means for guiding the pin carrying the intermediate wheels of the said bevel wheel differential gear longitudinally in the said clutch member, a brake comprising a spring ring bearing by means of adjustable nuts internally against pawls rotatably mounted on a ring rigidly connected to the driving shaft and a ring having an enlarged part and being rotatably mounted on an extension of the shiftable clutch member, substantially as set forth.

In testimony whereof I have hereunto set my hand in presence of two subscribing witnesses.

CARL GRÜTZNER.

Witnesses:
　HENRY HASPER,
　WOLDEMAR HAUPT.

---

Copies of this patent may be obtained for five cents each, by addressing the "Commissioner of Patents, Washington, D. C."